(12) United States Patent
Kim et al.

(10) Patent No.: US 11,764,345 B2
(45) Date of Patent: Sep. 19, 2023

(54) COATING APPARATUS

(71) Applicant: LG Chem, Ltd., Seoul (KR)

(72) Inventors: Woo-Ha Kim, Daejeon (KR); In-Seong Kim, Daejeon (KR); Il-Jae Moon, Daejeon (KR); Byoung-Hoon Ahn, Daejeon (KR); Jung-Min Yang, Daejeon (KR); Sang-Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 3 days.

(21) Appl. No.: 17/349,276

(22) Filed: Jun. 16, 2021

(65) Prior Publication Data

US 2021/0313552 A1    Oct. 7, 2021

Related U.S. Application Data

(63) Continuation of application No. 16/341,299, filed as application No. PCT/KR2018/007300 on Jun. 27, 2018, now Pat. No. 11,127,936.

(30) Foreign Application Priority Data

Jul. 13, 2017    (KR) ........................ 10-2017-0089132

(51) Int. Cl.
  *B05C 5/02*    (2006.01)
  *H01M 4/04*    (2006.01)
(52) U.S. Cl.
  CPC ............. *H01M 4/04* (2013.01); *B05C 5/0254* (2013.01); *B05C 5/0266* (2013.01)
(58) Field of Classification Search
  CPC ......................................... B05C 5/0254–0266
  See application file for complete search history.

(56) References Cited

U.S. PATENT DOCUMENTS

| 6,423,144 B1 * | 7/2002 | Watanabe | B05C 5/002 |
| | | | 118/410 |
| 7,625,449 B2 * | 12/2009 | Pekurovsky | B05C 5/0254 |
| | | | 118/DIG. 2 |

(Continued)

FOREIGN PATENT DOCUMENTS

| CN | 102527575 A | 7/2012 |
| CN | 104487176 A | 4/2015 |

(Continued)

OTHER PUBLICATIONS

International Search Report Cited in PCT/KR2018/007300 dated Dec. 10, 2018.

(Continued)

*Primary Examiner* — Dah-Wei D. Yuan
*Assistant Examiner* — Stephen A Kitt
(74) *Attorney, Agent, or Firm* — Lerner David LLP

(57) ABSTRACT

Disclosed is a coating apparatus for producing an electrode, which has a reduced defect rate in the coating process. The coating apparatus includes a die unit having an inlet through which the electrode slurry is introduced and an inner space for accommodating the introduced electrode slurry; a shim unit mounted in the die unit and configured to form an outlet together with the die unit so that the electrode slurry is discharged therethrough; and a cover member configured to surround an outer surface of the die unit and the shim unit so that the electrode slurry is not leaked at the outer surface, except for the outlet.

7 Claims, 8 Drawing Sheets

(56) References Cited

U.S. PATENT DOCUMENTS

| | | |
|---|---|---|
| 2011/0236570 A1 | 9/2011 | Higashi |
| 2011/0287171 A1 | 11/2011 | Seo et al. |
| 2013/0236651 A1 | 9/2013 | Komatsubara et al. |
| 2013/0280570 A1 | 10/2013 | Kim et al. |
| 2015/0053133 A1 | 2/2015 | Park et al. |
| 2016/0016185 A1 | 1/2016 | Park et al. |

FOREIGN PATENT DOCUMENTS

| | | | |
|---|---|---|---|
| JP | 2001191001 A | | 7/2001 |
| JP | 2006035061 A | | 2/2006 |
| JP | 4080261 B2 | | 4/2008 |
| JP | 2009291737 A | | 12/2009 |
| JP | 2009291737 A | * | 12/2009 |
| JP | 2016073950 A | | 5/2016 |
| JP | 2016073951 A | | 5/2016 |
| KR | 1011946 B1 | | 1/2011 |
| KR | 20110070061 A | | 6/2011 |
| KR | 20110128589 A | | 11/2011 |
| KR | 20130102490 A | | 9/2013 |
| KR | 20140019453 A | | 2/2014 |
| KR | 20160010808 A | | 1/2016 |
| KR | 20170033087 A | | 3/2017 |
| KR | 20170067362 A | | 6/2017 |

OTHER PUBLICATIONS

Extended European Search Report including the Written Opinion for Application No. EP 18832388.5 dated Mar. 19, 2020, 7 pages.
Search Report from Office Action for Chinese Application No. 201880004215.7 dated Jul. 5, 2021; 2 pages.

* cited by examiner

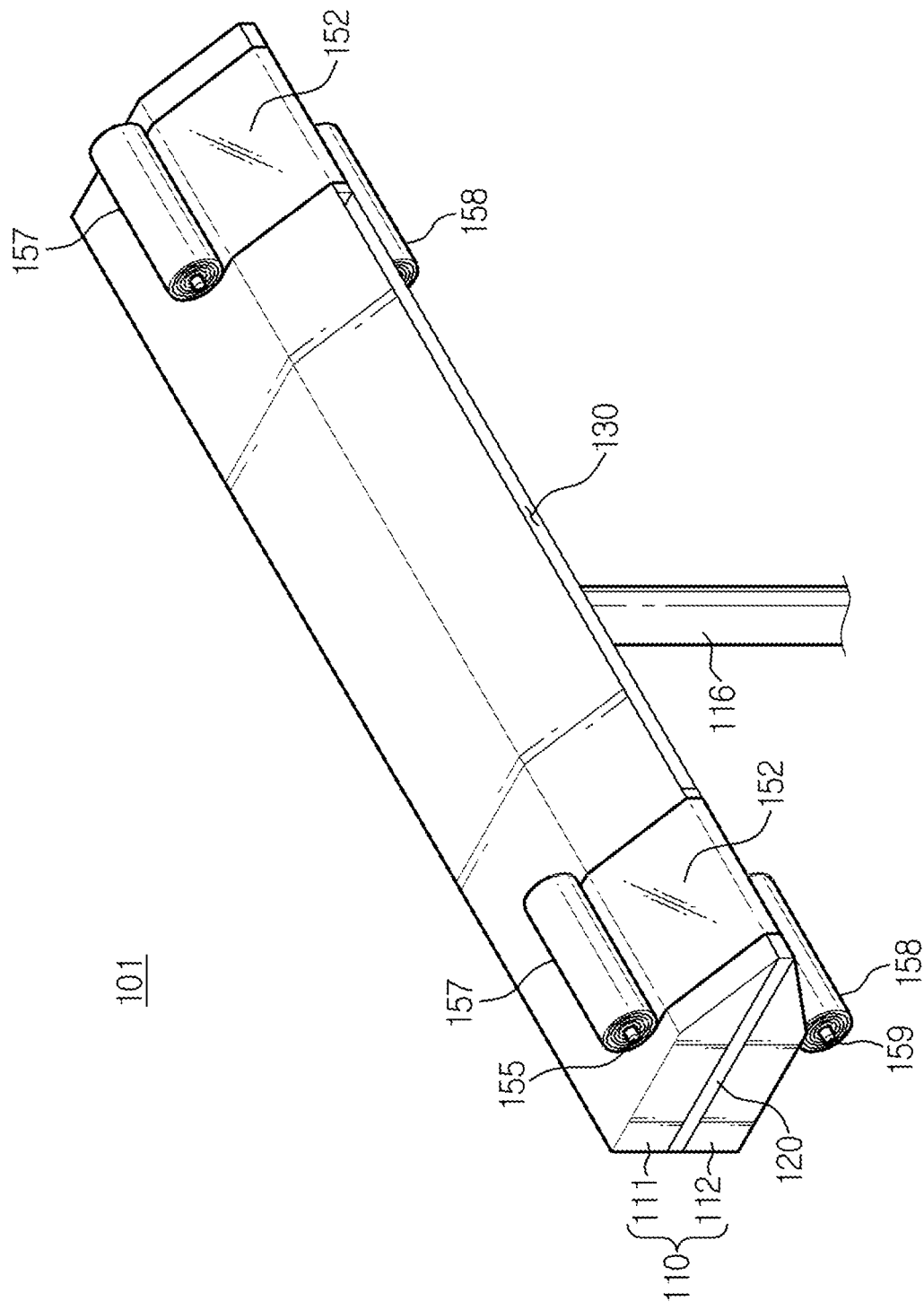

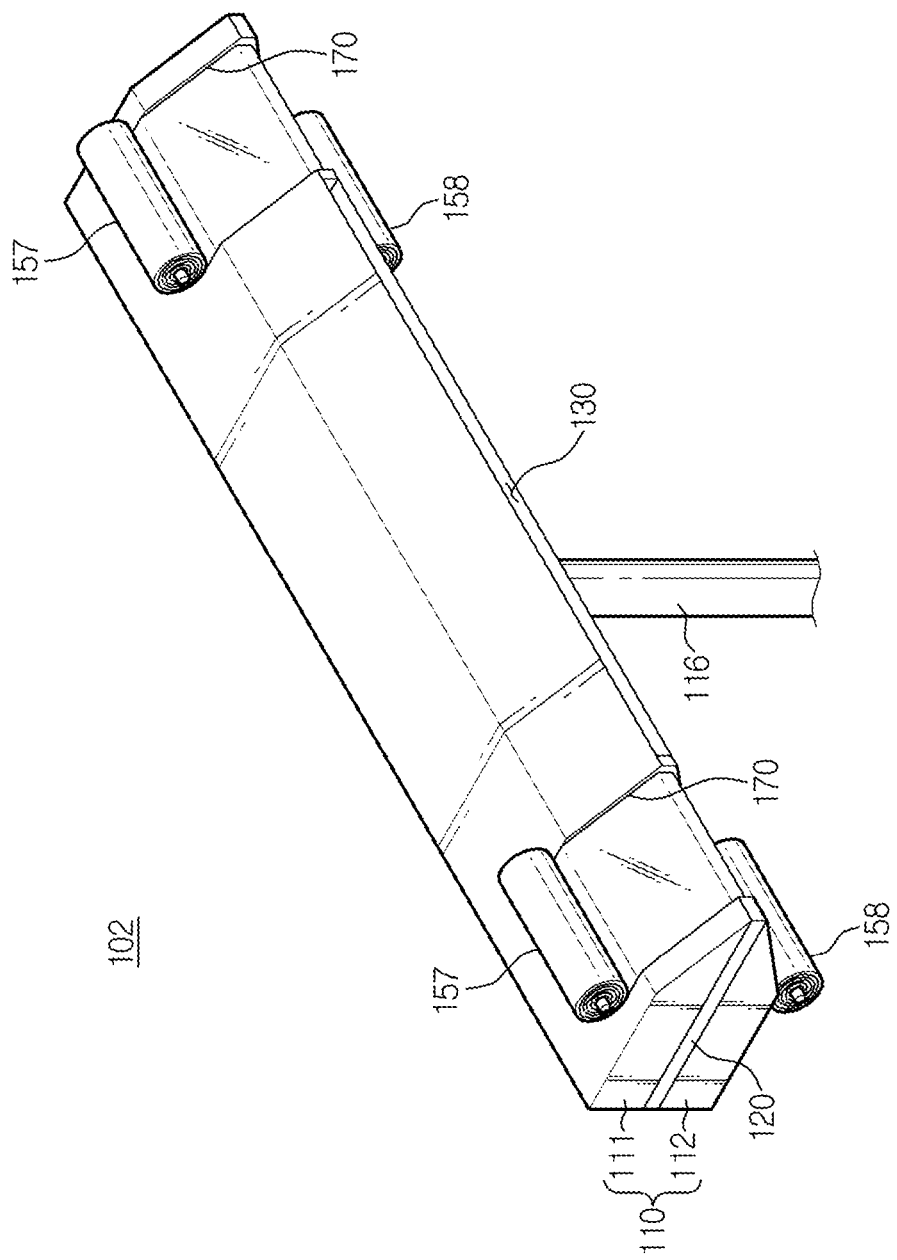

COATING APPARATUS

CROSS-REFERENCE TO RELATED APPLICATIONS

This application is a continuation of U.S. application Ser. No. 16/341,299, filed on Apr. 11, 2019, which is a national phase entry under 35 U.S.C. § 371 of International Application No. PCT/KR2018/007300, filed on Jun. 27, 2018, which claims priority from Korean Patent Application No. 10-2017-0089132 filed on Jul. 13, 2017, all of which are incorporated herein by reference.

TECHNICAL FIELD

The present disclosure relates to an electrode producing coating apparatus for coating an electrode slurry on an electrode plate, and more particularly, to a coating apparatus having a cover member that covers an outer surface of a die unit and a shim unit so that the electrode slurry is not leaked at an outer surface of the coating apparatus, except for an outlet.

BACKGROUND ART

Secondary batteries that are highly applicable to a wide range of products and have electrical characteristics such as high energy density are applied not only to portable devices but also to electric vehicles, hybrid vehicles and the like, driven by electric driving sources. Secondary batteries are attracting attention as a new energy source for improving environment-friendliness and energy efficiency in that they have not only a primary advantage of reducing the use of fossil fuels but also generate no by-product due to the use of energy.

Secondary batteries currently widely used in the art include a lithium ion battery, a lithium polymer battery, a nickel cadmium battery, a nickel hydrogen battery, a nickel zinc battery and so on. The operating voltage of such a unit secondary battery cell, namely a unit battery cell, is about 2.5V to 4.2V. Thus, if a higher output voltage is required, a plurality of battery cells may be connected in series to configure a battery pack. Also, depending on the charge/discharge capacity required for the battery pack, a plurality of battery cells may be connected in parallel to configure a battery pack. Thus, the number of battery cells included in the battery pack may be variously set according to the required output voltage or charge/discharge capacity.

A battery cell serving as the secondary battery, particularly a battery cell serving as a lithium secondary battery, is generally configured by impregnating a lithium electrolyte into an electrode assembly that includes a positive electrode having a lithium transition metal oxide as an electrode active material, a negative electrode having a carbonaceous active material, and a separator.

The electrode of the battery cell is generally fabricated by coating an electrode foil with electrode slurry. The electrode slurry is prepared by mixing an electrode mixture containing an electrode active material, a conductive material and a binder for bonding the materials to an electrode foil in an organic solvent. Here, the positive electrode active material mainly employs a lithium cobalt oxide, a lithium manganese oxide, a lithium nickel oxide, a lithium composite oxide or the like, and the negative electrode active material mainly employs a carbonaceous material.

In addition, the electrode of the battery cell is generally formed by dispersing an active material, a conductive material, a binder and the like in a solvent to prepare a slurry, and then applying the slurry directly to a current collector or applying the slurry onto a separate support and then laminating a film peeled from the support onto a current collector. After that, the electrode is wound into a roll shape, and then residual solvent and residual moisture are removed using an electrode drying device.

Meanwhile, in a conventional electrode producing coating apparatus, an additional workpiece called a shim is inserted into a die to maximize the usability of a slot die, thereby realizing a coating width or a pattern shape.

FIG. 1 is a schematic plane view for illustrating a process of coating an electrode slurry on an electrode plate by using a conventional electrode producing coating apparatus. Referring to FIG. 1, a conventional electrode producing coating apparatus 10 includes a slot die unit 1 and a shim unit (not shown). Here, the slot die unit 1 forms an outlet 3 through which an electrode slurry 8 is discharged, together with the shim unit, and the electrode slurry 8 is applied to an electrode plate 5 located on a coater roll 2 through the outlet 3.

However, in the conventional coating apparatus 10, a gap is generated between the die unit 1 and the shim unit due to a small difference in length or thickness between the slot die unit 1 and the shim unit, and the electrode slurry 8 flows into the gap between the die unit 1 and the shim unit, so a certain amount of the electrode slurry 8 is gathered on an outer surface of the die unit 1 and the shim unit, rather than at the outlet 3, like a dew as indicated by A1. In particular, this phenomenon occurs more frequently when the electrode slurry 8 has higher viscosity or stronger elasticity.

FIG. 2 is a photograph showing a portion B of an electrode plate prepared using the conventional coating apparatus of FIG. 1.

The dew-shaped electrode slurry 8 formed at the portion A1 around the outlet as shown in FIG. 1 may be unnecessarily coated on a portion 6 of an electrode plate 5, which does not require coating during the coating process, like the electrode slurry 8 of a dot form in the portion A2, as in the electrode plate 5 in the photograph of FIG. 2. However, the electrode slurry 8 coated in a dot form may be recognized as a coating failure by a reading unit that determines a failure in the manufacturing process, thereby increasing the defect rate.

In addition, after the coating process, when an electrode tab is formed by shaping the uncoated portion of the electrode plate, the dot-type electrode slurry coated on one surface of the electrode tab may act as a factor that disturbs welding between the electrode tab and the electrode lead, thereby causing weak welding.

Moreover, as the electrode slurry coated in a dot form increases at the uncoated portion, the possibility of ignition of the battery could be increased due to the local capacity change of a positive electrode or a negative electrode.

DISCLOSURE

Technical Problem

The present disclosure is designed to solve the problems of the related art, and therefore the present disclosure is directed to providing a coating apparatus, which may reduce the defect rate during the electrode production and provide a safer battery by preventing an electrode slurry from being leaked at an outer surface of the coating apparatus, except for an outlet.

These and other advantages of the present disclosure may be understood from the following detailed description and will become more fully apparent from the exemplary embodiments of the present disclosure. Also, it will be easily understood that the advantages of the present disclosure may be realized by the means shown in the appended claims and combinations thereof.

Technical Solution

In one aspect of the present disclosure, there is provided a coating apparatus for coating an electrode slurry to an electrode plate to produce an electrode, comprising: a die unit having an inlet through which the electrode slurry is introduced and an inner space for accommodating the introduced electrode slurry; a shim unit mounted in the die unit and configured to form an outlet together with the die unit so that the electrode slurry is discharged therethrough; and a cover member configured to surround an outer surface of the die unit and the shim unit so that the electrode slurry is not leaked at the outer surface, except for the outlet.

Here, the die unit may include an upper die forming an upper portion of the inner space; and a lower die located below the upper die to form a lower portion of the inner space.

Also, the shim unit may be interposed between the upper die and the lower die.

Further, the shim unit may include a frame formed along a rim of the inner space and having at least one open side, and one side of the frame may be opened so that the electrode slurry is carried and discharged therethrough.

In addition, the coating apparatus may further comprise a coater roll located to be spaced apart from the outlet and configured to carry an electrode plate coated with the electrode slurry on an upper surface thereof.

Meanwhile, the cover member may include at least one cover film extending in the upper and lower direction.

Also, the cover film may be respectively located at both sides of the outlet at an outer surface of the die unit and the shim unit at a side where the outlet is formed.

Moreover, one side edge of the cover film may be in contact with an outer circumferential side of the outlet.

In addition, the cover film may have an adhesive layer formed on one surface thereof that faces the die unit and the shim unit by coating an adhesive material thereon.

Further, the cover member partially may have a structure filled in a gap between the die unit and the shim unit.

Meanwhile, the cover member may include an unwinder having a roller for unwinding and supplying a rolled cover film; and a winder having a roller for rewinding and retrieving the cover film.

Also, any one of the unwinder and the winder may be located at an upper portion of the upper die, and the other may be located at a lower portion of the lower die.

Moreover, the rollers of the unwinder and the winder may be installed at locations spaced apart from the outlet in a direction opposite to a coating target.

In addition, the unwinder and the winder may simultaneously unwind and wind the cover film so that a gap is not created between one surface of the cover film and the outer surface of the die unit and the shim unit.

Also, guide grooves may be formed at the outer surfaces of the upper die and the lower die to guide the cover film along a predetermined path.

Advantageous Effects

According to an embodiment of the present disclosure, in the coating apparatus of the present disclosure, the cover member covers the outer surface of the die unit and the shim unit so that the electrode slurry is not leaked at the outer surface, except for the outlet portion, it is possible to prevent the electrode slurry from being introduced through the gap generated at the coupling surface of the die unit and the shim unit and flowing out.

Thus, in the present disclosure, it is possible to prevent the electrode slurry leaked at the outer surface except for the outlet from being coated to the uncoated portion that does not require coating of the electrode plate.

In particular, in the present disclosure, since it is prevented that the electrode slurry is coated to the uncoated portion, it is possible to reduce the coating failure rate of the electrode plate, and thus it is possible to prevent the electrode tab and the electrode lead from being welded with a weak coupling force due to the contamination of the electrode tab.

In addition, according to an embodiment of the present disclosure, since the cover film may be closely adhered and fixed to the outer surface of the die unit and the shim unit by means of the adhesive layer formed on one surface thereof, it is possible to prevent the electrode slurry from being leaked with a higher sealing force. Further, the cover film may be easily attached to the outer surface of the die unit and the shim unit by means of the adhesive layer.

In addition, according to an embodiment of the present disclosure, if it is required to replace the cover film since the cover film is partially contacted with the electrode slurry discharged through the outlet and thus corroded or the cover film swells by absorbing the solvent of the electrode slurry, the cover film may be easily replaced with a new cover film by using an unwinder and a winder.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 9 is a perspective view schematically showing a partial configuration of a coating apparatus according to another embodiment of the present disclosure.

FIG. 10 is a perspective view schematically showing a partial configuration of a coating apparatus according to still another embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
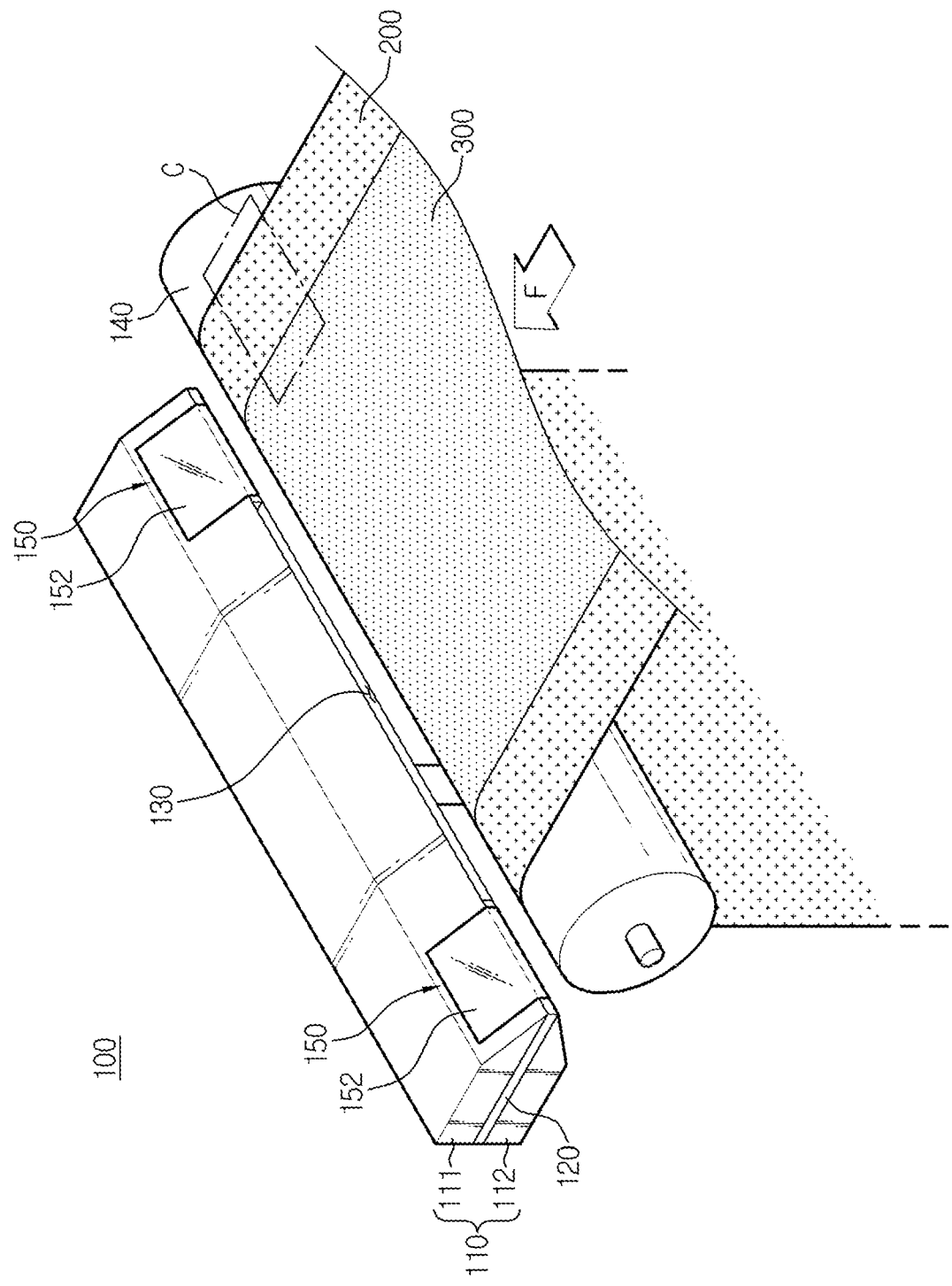
FIG. 3 is a perspective view schematically showing a coating apparatus according to an embodiment of the present disclosure.

FIG. 3 is a perspective view schematically showing a coating apparatus according to an embodiment of the present disclosure. In addition, FIG. 4 is an exploded perspective view showing a die unit and a shim unit, employed at the coating apparatus of FIG. 3.

Figure 4:
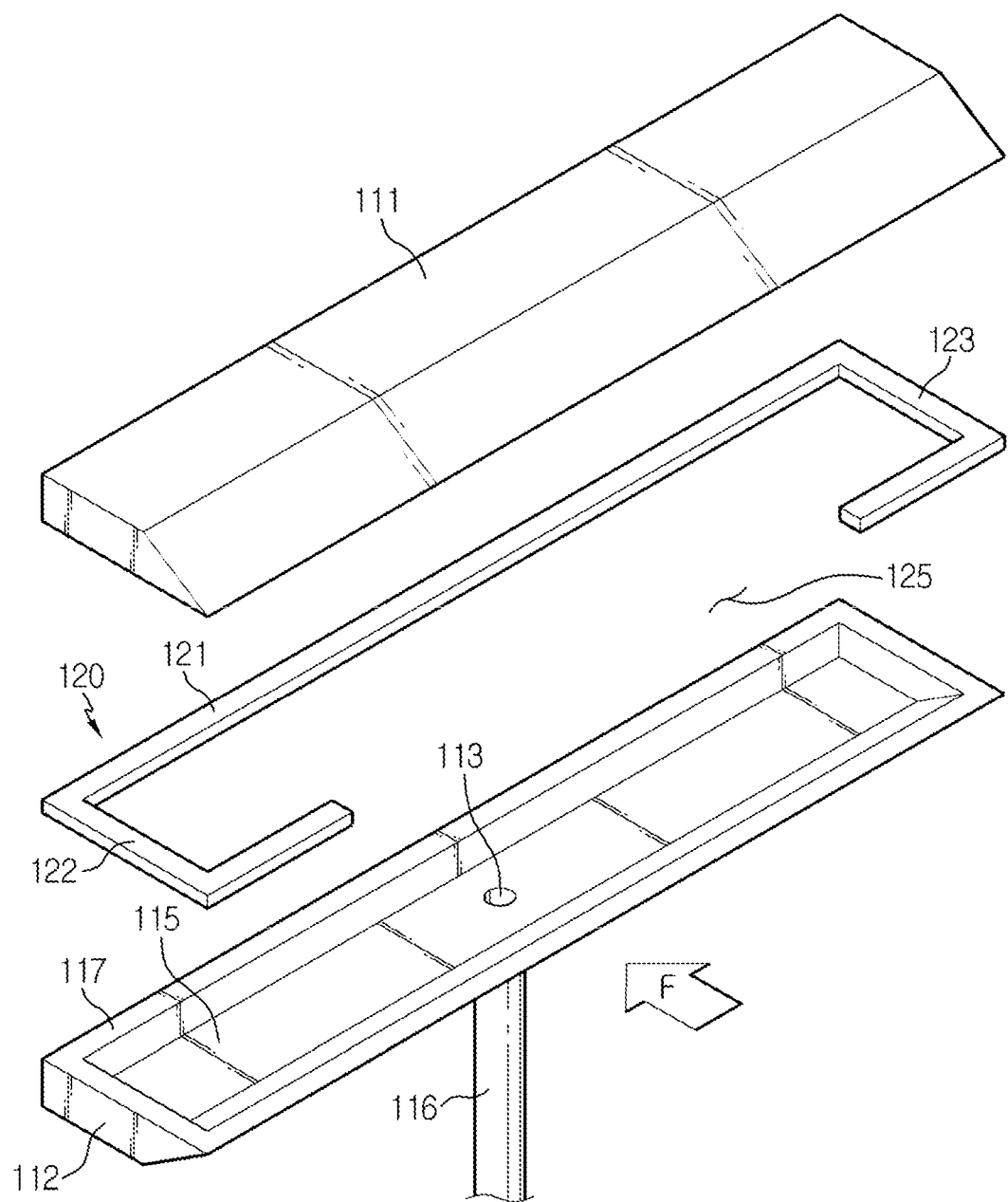
FIG. 4 is an exploded perspective view showing a die unit and a shim unit, employed at the coating apparatus of FIG. 3.

Referring to FIGS. 3 and 4, an electrode producing coating apparatus 100 for coating an electrode slurry 300 to an electrode plate 200 is depicted.

The coating apparatus 100 includes a die unit 110, a shim unit 120 and a cover member 150.

Here, the die unit 110 has an inner space 115 for accommodating an electrode slurry 300 introduced from the outside. Specifically, the inner space 115 may function as a buffer so that the discharge flow rate is not greatly changed while the electrode slurry 300 is being discharged to the outside. Thus, it is appropriate that the inner space 115 has a space capable of accommodating the electrode slurry 300 in an amount sufficient to serve as a buffer.

In addition, the die unit 110 may have an inlet 113 communicating with the inner space 115 and allowing the electrode slurry 300 to be introduced from the outside.

Specifically, the inlet 113 may be formed at a lower portion of the die unit 110. Further, the inlet 113 may be connected to an inflow tube 116 of a certain depth.

That is, the die unit 110 allows the electrode slurry 300 to be carried upwards from a lower portion along the inflow tube 116 from the outside and flow into the die unit 110 through the inlet 113 connected to the inflow tube 116. The introduced electrode slurry 300 is temporarily accommodated in the inner space 115.

More specifically, the die unit 110 may include an upper die 111 and a lower die 112.

Here, the upper die 111 may be provided to form an upper portion of the inner space 115 of the die unit 110, when being observed in the direction F. Specifically, a lower surface of the upper die 111 may form an upper surface of the inner space 115. For example, the lower surface of the upper die 111 may have a flat rectangular shape.

Meanwhile, the terms indicating directions such as front, rear, left, right, upper and lower may be varied depending on the position of an observer or the shape of an object. For the convenience of explanation, in the present specification, the directions such as front, rear, left, right, upper and lower are defined based on the view in the F direction.

In addition, the lower die 112 may be positioned below the upper die 111 to form a lower portion of the inner space 115. Specifically, an upper surface of the lower die 112 may have a downwardly recessed structure. The inner space 115 may set the volume capable of accommodating the electrode slurry 300 according to the depth or area of the recessed structure.

Further, the inlet 113 may be formed at an inner surface of the inner space 115 of the lower die. That is, the inner space 115 may accommodate the electrode slurry 300 introduced through the inlet 113 from the outside.

In addition, the shim unit 120 may be mounted in the die unit 110.

Specifically, the shim unit 120 may be interposed between the upper die 111 and the lower die 112. That is, an upper surface of the shim unit 120 may be coupled with the lower surface of the upper die 111, and a lower surface thereof may be coupled to the upper surface of the lower die 112.

Further, the shim unit 120 may include a frame formed along a rim of the inner space 115 and having at least one open side. That is, one side of the frame may be opened so that the electrode slurry 300 is carried and discharged therethrough.

In other words, as shown in FIG. 4, the frame of the shim unit 120 may include a first bar 121, a second bar 122 and a third bar 123 whose ends are connected to each other. At this time, first ends of the second bar 122 and the third bar 123 may be respectively connected to both ends of the first bar 121 at a right angle with respect to the first bar 121. In addition, at the other end of the second bar 122, which is not connected to the first bar 121, a bending structure bent in a direction toward the third bar 123 may be formed. Also, at the other end of the third bar 123, which is not connected to the first bar 121, a bending structure bent in a direction toward the second bar 122 may be formed.

In addition, the shim unit 120 may form an outlet 130 together with the die unit 110 so that the electrode slurry 300 is discharged therethrough.

That is, since the frame of the shim unit 120 having one open side has an opening or gap 125 at one side thereof so that the electrode slurry 300 is carried and discharged therethrough, the opening 125 may serve as the outlet 130 when the shim unit 120 is assembled to be interposed between the upper die 111 and the lower die 112. For example, as shown in FIG. 3, the opening 125 may be formed at the frame of the shim unit 120 to serve as the outlet 130.

Specifically, when being observed in the direction F, an upper side of the outlet 130 may be configured using the lower portion of the upper die 111, a lower side of the outlet 130 may be configured using the upper portion of the lower die 112, and a left side and a right side of the outlet 130 may be configured using the opening 125 of the frame of the shim unit 120.

That is, in the coating apparatus 100, the electrode slurry 300 introduced through the inlet 113 of the die unit 110 fills the inner space 115 of the die unit 110, and the electrode slurry 300 may be discharged through the outlet 130, which is the opening 125, from the inner space 115 to the outside.

Meanwhile, the cover member 150 may be formed to surround the outer surface of the die unit 110 and the shim unit 120. Specifically, the cover member 150 may be formed to be closely adhered to the outer surface of the die unit 110 and the shim unit 120 in order to prevent that the electrode slurry 300 is introduced through a gap created at the coupling surface between the die unit 110 and the shim unit 120 and leaks out.

In particular, the cover member 150 may be positioned such that the electrode slurry 300 is not leaked out at the outer surface of the die unit 110 and the shim unit 120, except for the outlet 130. For example, as shown in FIG. 3, the cover member 150 may be formed to be closely adhered to the outer surface of the die unit 110 and the shim unit 120, except for the outlet 130, at the outer surface where the outlet 130 is formed.

According to this configuration of the present disclosure, since it is prevented that the electrode slurry 300 is introduced through the gap created at the coupling surface between the die unit 110 and the shim unit 120 and leaks out, it is possible to prevent an uncoated portion, where the coating of the electrode plate 200 is unnecessary, from being inadvertently coated with the electrode slurry 300 leaked around the outlet 130.

Figure 5:
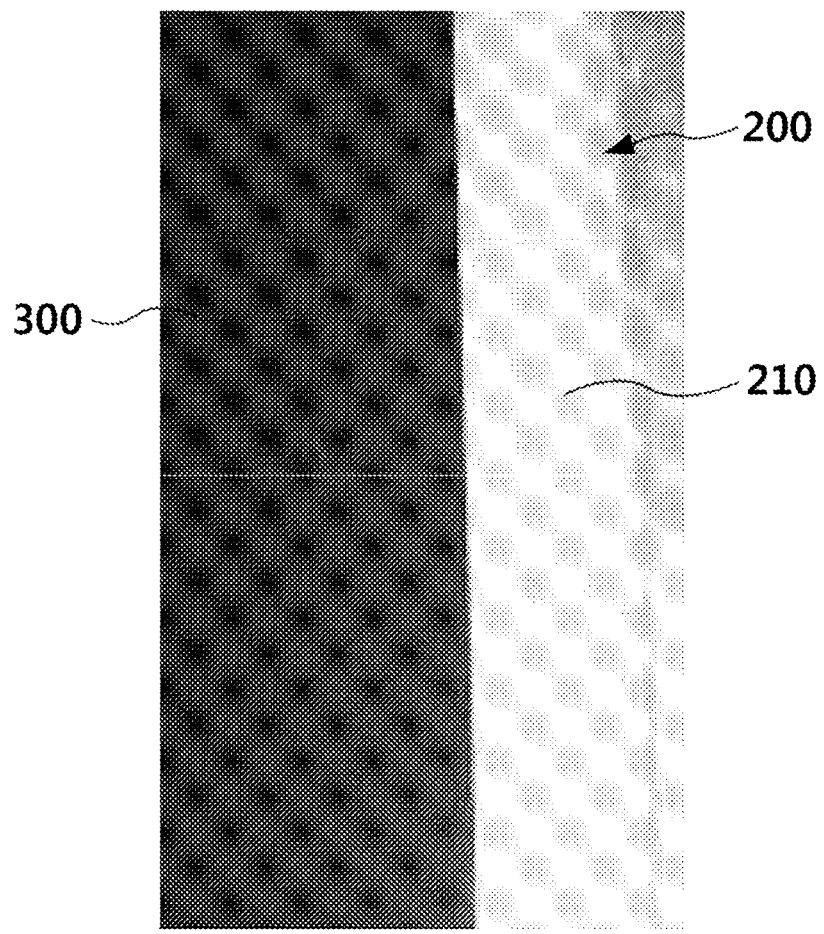
FIG. 5 is a photograph showing a portion C of an electrode plate of FIG. 3 prepared using the coating apparatus according to an embodiment of the present disclosure.

FIG. 5 is a photograph showing a portion C of an electrode plate of FIG. 3 prepared using the coating apparatus according to an embodiment of the present disclosure.

Figure 1:
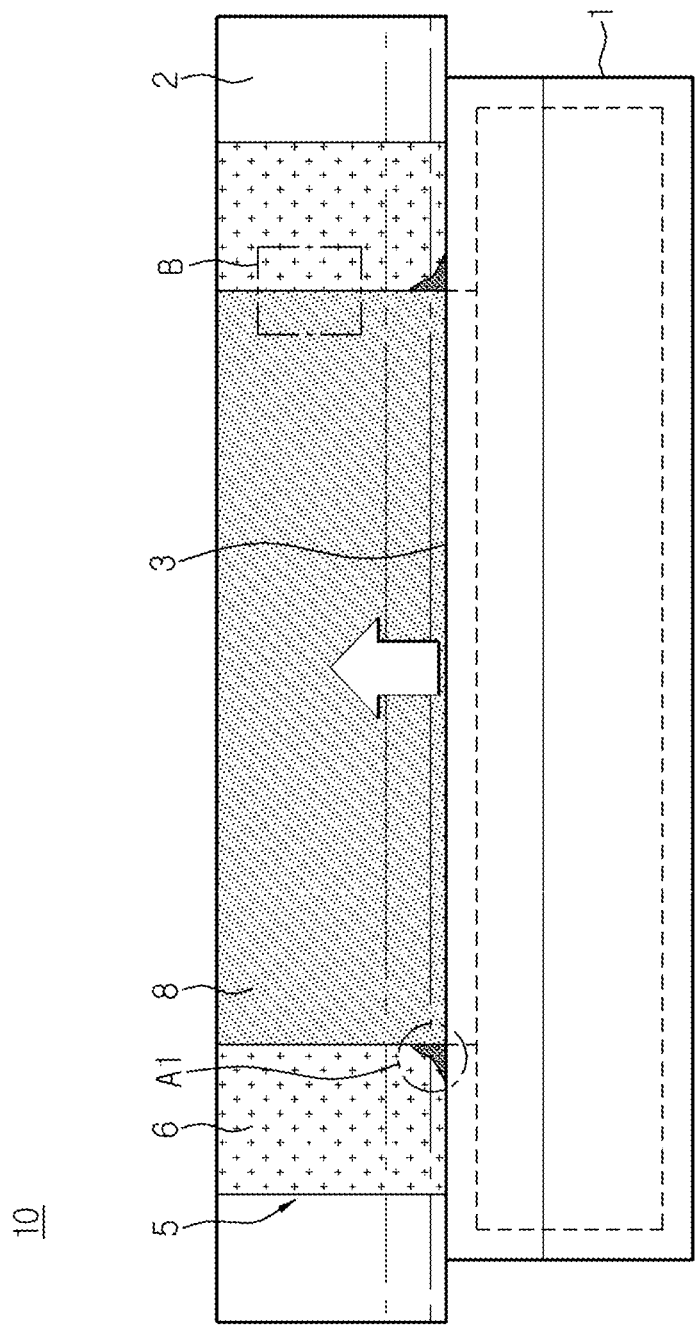
FIG. 1 is a schematic plane view for illustrating a process of coating an electrode slurry on an electrode plate by using a conventional electrode producing coating apparatus.
Figure 2:
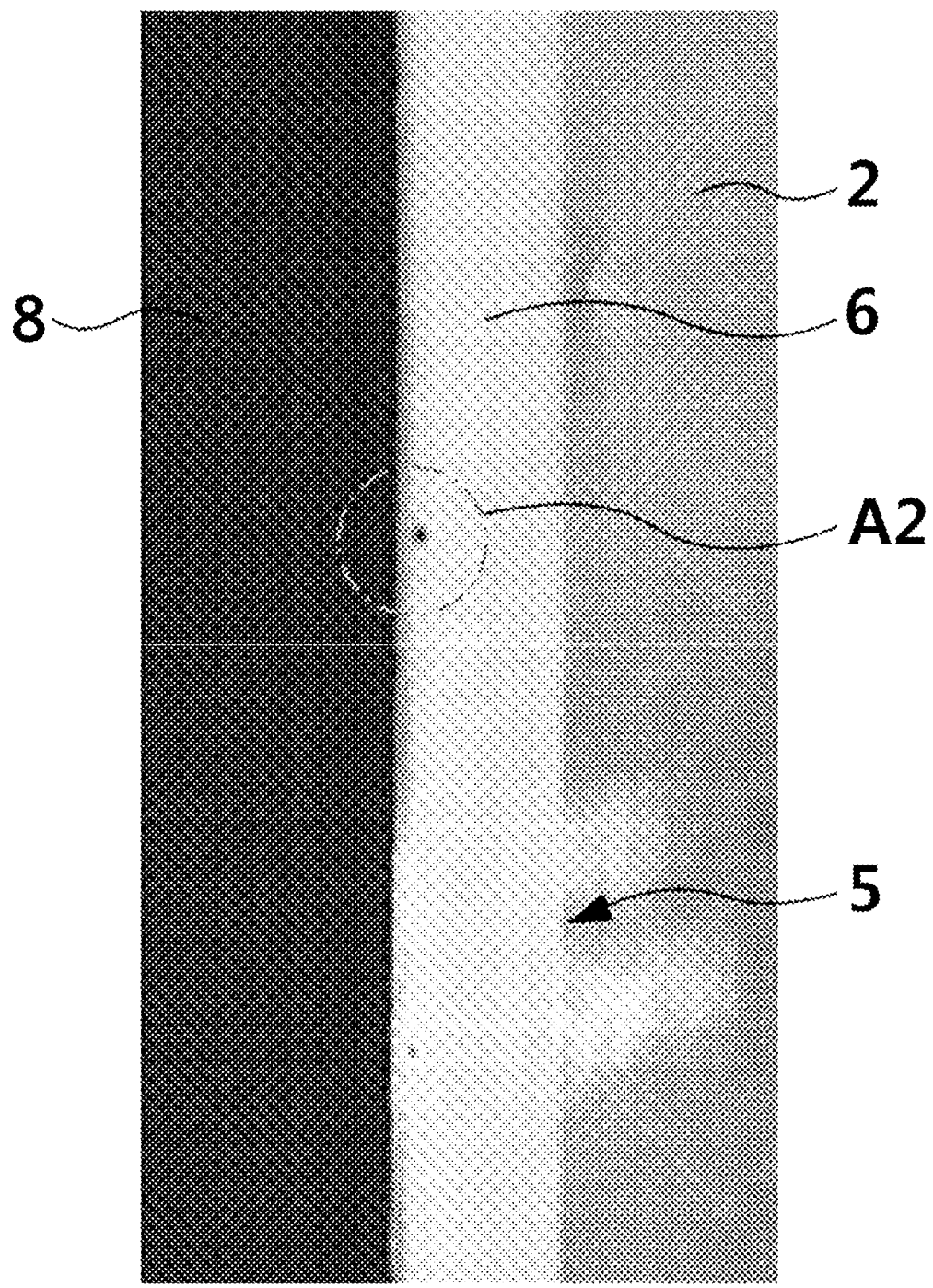
FIG. 2 is a photograph showing a portion B of an electrode plate prepared using the conventional coating apparatus of FIG. 1.

Referring to FIG. 5, if the electrode slurry 300 is coated to the electrode plate 200 by using the coating apparatus 100 according to the present disclosure, unlike the conventional electrode plate 5 depicted in the photograph of FIG. 2, the uncoated portion 210 of the electrode plate 200, which need not be coated with the electrode slurry 300, is not coated with the electrode slurry 300 in a dot form.

Meanwhile, referring to FIG. 3 again, the coating apparatus 100 may further include a coater roll 140.

Here, the coater roll 140 may be spaced apart from the outlet 130 by a suitable distance. It is appropriate that the spacing distance is set such that the electrode slurry 300 discharged from the outlet 130 is not released to the outside without being coated to the electrode plate 200.

For example, if the distance between the outer surface of the coater roll 140 and the outlet 130 is too great, the electrode slurry 300 discharged from the outlet 130 may be easily lost downward by gravity. Meanwhile, if the distance is too small, the electrode slurry 300 is likely to collide with the plate 200 and be dispersed to the outside, and it may be difficult to control the electrode slurry 300 to be discharged with a constant coating amount.

Further, the coater roll 140 may be rotated to carry the electrode plate 200 coated with the electrode slurry 300. That is, when the electrode slurry 300 is coated to the electrode plate 200 mounted to the outer surface of the coater roll 140, the coater roll 140 may rotate to move the electrode plate 200 at a certain speed.

According to this configuration of the present disclosure, the coater roll 140 is configured to continuously coat the electrode slurry 300 onto the electrode plate 200 while maintaining a constant coating amount.

Meanwhile, the cover member 150 may include at least one cover film 152.

Specifically, the cover film 152 may have a structure extending in the upper and lower direction. More specifically, the cover film 152 may have an extending structure capable of surrounding the outer surface of the upper die 111, the outer surface of the shim unit 120 and the outer surface of the lower die 112 in order, so that the gap created between the die unit 110 and the shim unit 120 may be covered.

According to this configuration of the present disclosure, the cover film 152 may effectively prevent the electrode slurry from leaking through the gap between the die unit 110 and the shim unit 120.

Further, the cover film 152 may be positioned at both sides of the outlet 130 at one outer surface of the die unit 110 and the shim unit 120 at a side where the outlet 130 is formed, respectively. That is, when being observed in the direction F, the cover films 152 may be respectively positioned at both left and right sides based on the outlet 130 so as to seal the gaps formed at the coupling surfaces between the die unit 110 and the shim unit 120, which are positioned at both sides of the outlet 130.

More specifically, the cover film 152 may be formed so that its one side edge comes into contact with an outer circumferential side of the outlet 130. That is, since the electrode slurry is leaked more frequently in the region near the outlet 130, it is appropriate that the cover films 152 are disposed as close to the outlet 130 as possible.

For example, as shown in FIG. 3, if the outlet 130 is formed in a rectangular shape elongated in the left and right direction, the cover film 152 may also have a rectangular shape. At this time, the cover film 152 located at the left of the outlet 130 may be formed such that its right side is in contact with the left side of the rectangular outlet 130, and the cover film 152 located at the right of the outlet 130 may be formed such that its left side is in contact with the right side of the rectangular outlet 130.

However, the present invention is not limited to this structure, and the cover film 152 may be positioned at any location on the outer surface where the coupling surface of the die unit 110 and the shim unit 120 is present.

According to this configuration of the present disclosure, since the cover film 152 may seal the region around the outlet 130 where the electrode slurry leaks most frequently, it is possible to effectively prevent the leakage of the electrode slurry.

Figure 6:
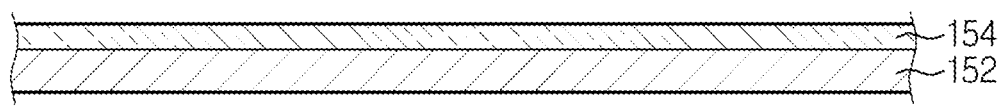
FIG. 6 is a cross-sectioned view schematically showing a portion of a cover film, employed at a cover member according to another embodiment of the present disclosure.

FIG. 6 is a cross-sectioned view schematically showing a portion of a cover film, employed at a cover member according to another embodiment of the present disclosure.

Referring to FIG. 6 along with FIG. 3, the cover film 152 employed at the cover member 150 according to another disclosure of the present disclosure may further include an adhesive layer 154.

Here, the adhesive layer 154 may have a sufficient adhesive force to attach the cover film 152 to the outer surface of the die unit 110 and the shim unit 120. Further, the adhesive layer 154 may be formed by coating an adhesive material to one surface of the cover film 152 that faces the die unit 110 and the shim unit 120.

For example, as shown in FIG. 6, the cover film 152 may form the adhesive layer 154 by coating an adhesive material onto the entire upper surface thereof.

According to this configuration of the present disclosure, since the cover film 152 may be tightly adhered and fixed to the outer surface of the die unit 110 and the shim unit 120 through the adhesive layer 154, the cover film 152 may exhibit a high sealing force to prevent the electrode slurry from being leaked. Further, the cover film 152 may be easily installed at the outer surface of the die unit 110 and the shim unit 120.

Figure 7:
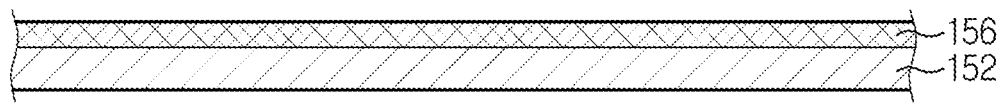
FIG. 7 is a cross-sectioned view schematically showing a portion of a cover film, employed at a cover member according to still another embodiment of the present disclosure.

FIG. 7 is a cross-sectioned view schematically showing a portion of a cover film, employed at a cover member according to still another embodiment of the present disclosure.

Referring to FIG. 7 along with FIG. 3, the cover film 152 may include a cohesive layer 156.

Here, the cohesive layer 156 may have an adhesive force that allows the cover film 152 to be easily attached to or detached from the outer surface of the die unit 110 and shim unit 120.

Specifically, the cohesive layer 156 may be formed by coating a cohesive material to one surface of the cover film 152 that faces the die unit 110 and the shim unit 120. For example, as shown in FIG. 7, the cover film 152 may form the cohesive layer 156 by coating a cohesive material onto the entire upper surface thereof.

According to this configuration of the present disclosure, the cover film 152 may be tightly adhered and fixed to the outer surface of the die unit 110 and the shim unit 120 through the cohesive layer 156. Moreover, if it is needed to exchange the cover film 152 with a new cover film 152, the cover film 152 may be easily exchanged with a new cover film 152 since it may be easily attached and detached.

Figure 8:
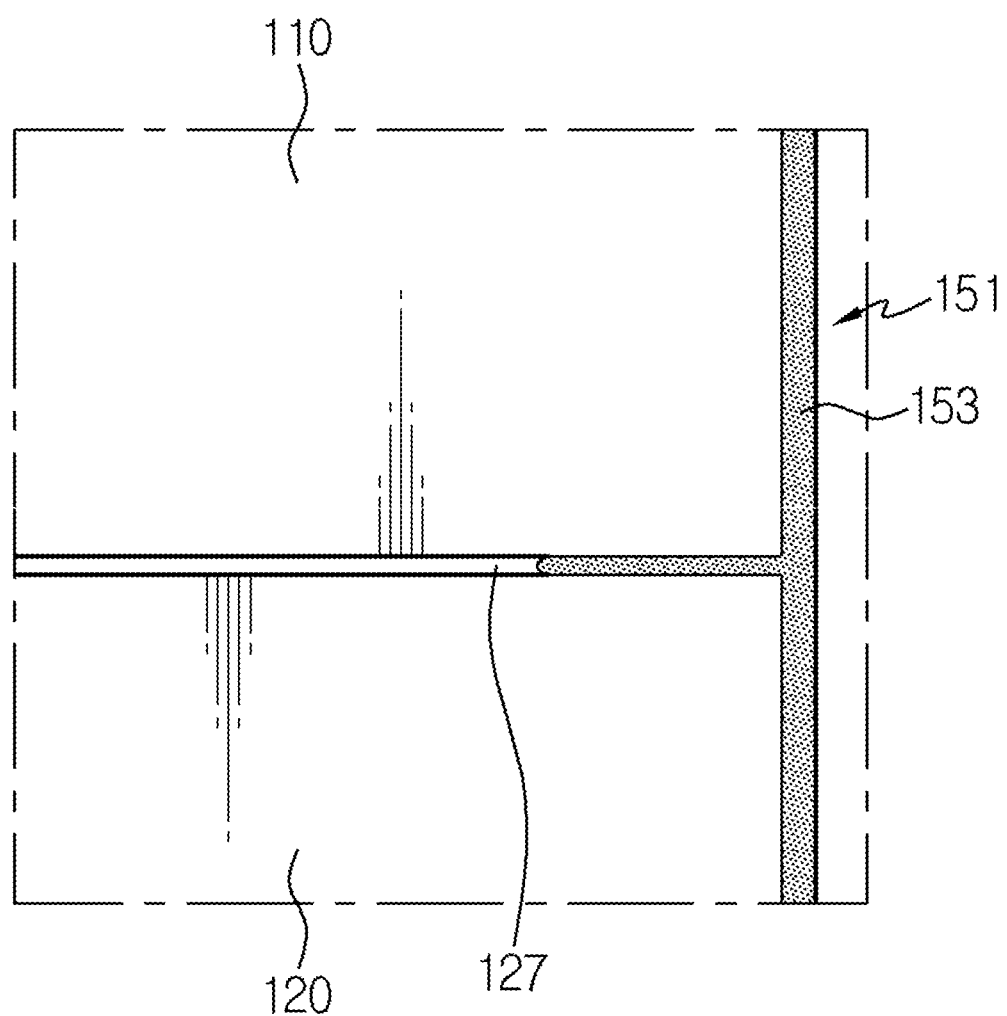
FIG. 8 is a cross-sectioned view schematically showing that the cover film employed at the cover member according to still another embodiment of the present disclosure is attached to an outer surface of the die unit and the shim unit.

FIG. 8 is a cross-sectioned view schematically showing that the cover film employed at the cover member according to still another embodiment of the present disclosure is attached to an outer surface of the die unit and the shim unit.

Referring to FIG. 8, the cover member 151 may have a structure in which a portion of the cover member 151 is filled in a gap 127 between the die unit 110 and the shim unit 120.

Specifically, the cover member 151 may include a cover film 153 coated on the outer surface of the die unit 110 and the shim unit 120 in a liquid form. Also, a portion of the cover film 153 coated in a liquid form may enter the gap 127 between the die unit 110 and the shim unit 120 to fill the gap 127.

According to this configuration of the present disclosure, it is possible to give a more reliable sealing force by sealing the gap along with the outer surface of the die unit 110 and the shim unit 120.

FIG. 9 is a perspective view schematically showing a partial configuration of a coating apparatus according to another embodiment of the present disclosure. However, in FIG. 9, the coater roll is not depicted for convenience of explanation.

Referring to FIG. 9, in a coating apparatus 101 according to another embodiment, the cover member 150 may include an unwinder 157 and a winder 158.

Here, the unwinder 157 may include a roller 155 for unwinding the wound cover film 152 be supplied to the outer surface of the die unit 110 and the shim unit 120.

In addition, the winder 158 may include a roller 159 for rewinding the existing cover film 152 to replace the cover film 152, which has been worn or swelled due to the influence of the electrode slurry discharged from the outlet 130, with a new cover film 152.

For example, as shown in FIG. 9, the unwinder 157 may have two rollers 155 respectively provided at left and right sides based on the outlet 130, at the upper portion of the upper die 111. In addition, the winder 158 may have two rollers 159 respectively provided at left and right sides based on the outlet 130, at the lower portion of the lower die 112.

According to this configuration of the present disclosure, when the cover film 152 is partially corroded by contacting the electrode slurry discharged through the outlet 130 or the cover film 152 swells by absorbing the solvent of the electrode slurry, it is possible to easily replace the cover film 152 with a new cover film by using the unwinder 157 and the winder 158, and also it is possible to increase production efficiency since it is not needed to stop the coating process in order to replace the cover film.

Further, any one of the unwinder 157 and the winder 158 may be located at the upper portion of the upper die 111, and the other may be located at the lower portion of the lower die 112.

For example, the unwinder 157 may be located at the upper portion of the upper die 111, and the winder 158 may be located at the lower portion of the lower die 112. In this configuration, the unwinder 157 supplies the cover film 152 to the outer surface of the die unit 110 and the shim unit 120, and the supplied cover film 152 may be kept tight by receiving a downward force from the winder 158 located at the bottom of the lower die 112.

After that, if replacement with a new cover film is required, the unwinder 157 may supply a new cover film 152 and simultaneously retrieve the existing cover film 152 by pulling the existing cover film 152 downward.

However, the present disclosure is not necessarily limited to such a configuration, the unwinder 157 may be positioned below the lower die 112 and the winder 158 positioned above the upper die 111, contrary to the above.

According to this configuration of the present disclosure, since the unwinder 157 and the winder 158 are positioned vertically apart from each other, the cover film 152 may receive a vertically pulling force due to the unwinder 157 and the winder 158, so that the cover film 152 may be pulled and kept tightly to be closely adhered to the outer surface of the die unit 110 and the shim unit 120.

Further, the rollers 155, 159 of the unwinder 157 and the winder 158 may be installed at positions spaced apart from the outlet 130 in a direction opposite to a coating target (or, in a rear direction).

Specifically, the rollers 155, 159 of the unwinder 157 and the winder 158 may be located at positions spaced apart toward the coating apparatus 100 (or, in a rear direction) based on the position of the outlet 130, so that the cover film 152 connected to the rollers 155, 159 is closely adhered to the outer surface of the die unit 110 and the shim unit 120.

According to this configuration of the present disclosure, the cover film 152 may easily keep tightly pulled to be closely attached to the outer surface of the die unit 110 and the shim unit 120 by using the rollers 159 of the unwinder 157 and the winder 158.

FIG. 10 is a perspective view schematically showing a partial configuration of a coating apparatus according to still another embodiment of the present disclosure. However, in FIG. 10, the coater roll is not depicted for convenience of explanation.

Referring to FIG. 10, a guide groove 170 for guiding the cover film 152 along a predetermined path may be formed at an outer surface of the upper die 111 and the lower die 112.

Specifically, the guide groove 170 may have a structure recessed inward with a size and width corresponding to the size and width of the cover film 152, based on a carrying direction of the cover film 152.

Due to this structure, the cover film 152 may be disposed so that both sides thereof are interposed in the guide groove 170, or may be carried along the guide groove 170 by the unwinder 157 and the winder 158. For example, as shown in FIG. 10, two cover films 152 may be positioned to be interposed in two guide grooves 170, respectively.

According to this configuration of the present disclosure, it is possible to prevent the cover film 152 from being partially positioned to block the outlet 130, and thus the electrode slurry discharged through the outlet 130 is prevented from interfering with the cover film 152, thereby minimizing the coating failure.

Meanwhile, even though terms indicating directions such as "up", "down", "right", "left", "front" and "rear" are used in this specification, it will be apparent to those skilled in the art that these terms are only for convenience of explanation and may vary depending on the position of a target to be observed or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: coating apparatus
110: die unit
111: upper die
112: lower die
120: shim unit
130: outlet
140: coater roll
150: cover member
152: cover film
157: unwinder
158: winder
170: guide groove

INDUSTRIAL APPLICABILITY

The present disclosure relates to a coating apparatus, and the coating apparatus may be used to produce an electrode for coating an electrode slurry to an electrode plate and to manufacture a secondary battery having the electrode. For example, the present disclosure may be used in industries related to secondary batteries mounted in electric vehicles.

The invention claimed is:

1. A coating apparatus for coating an electrode slurry to an electrode plate to produce an electrode, comprising:
    a die unit having an upper die forming an upper portion of an inner space for accommodating the electrode slurry, a lower die located below the upper die to form a lower portion of the inner space, and an inlet configured for introducing the electrode slurry therethrough;
    a shim unit interposed between the upper die and the lower die, the shim unit having a first bar, a second bar, and a third bar whose ends are connected to each other to form a frame along a rim of the inner space, and one side of the frame is open so as to form an outlet together with the die unit, the outlet configured for discharging the electrode slurry therethrough; and
    a cover member configured to surround an outer surface of the die unit and the shim unit so that the electrode slurry is not leaked at the outer surface, except for a discharge through the outlet,
    wherein the cover member is positioned so that it does not block or partially block the outlet,
    and wherein the cover member is movable with respect to the die unit and the shim unit.

2. The coating apparatus according to claim 1, further comprising:
    a coater roll located spaced apart from the outlet and configured to carry an electrode plate coated with the electrode slurry on an upper surface thereof.

3. The coating apparatus according to claim 1,
    wherein the cover member includes at least one cover film extending in an upper direction and a lower direction.

4. The coating apparatus according to claim 3,
    wherein the cover film is respectively located at both sides of the outlet at an outer surface of the die unit and the shim unit at a side where the outlet is formed.

5. The coating apparatus according to claim 4,
    wherein one side edge of the cover film is in contact with an outer circumferential side of the outlet.

6. The coating apparatus according to claim 5,
    wherein the cover film has an adhesive layer formed on one surface thereof that faces the die unit and the shim unit.

7. The coating apparatus according to claim 3,
    wherein the cover member partially has a structure filled in a gap between the die unit and the shim unit.

* * * * *